Figure 1:
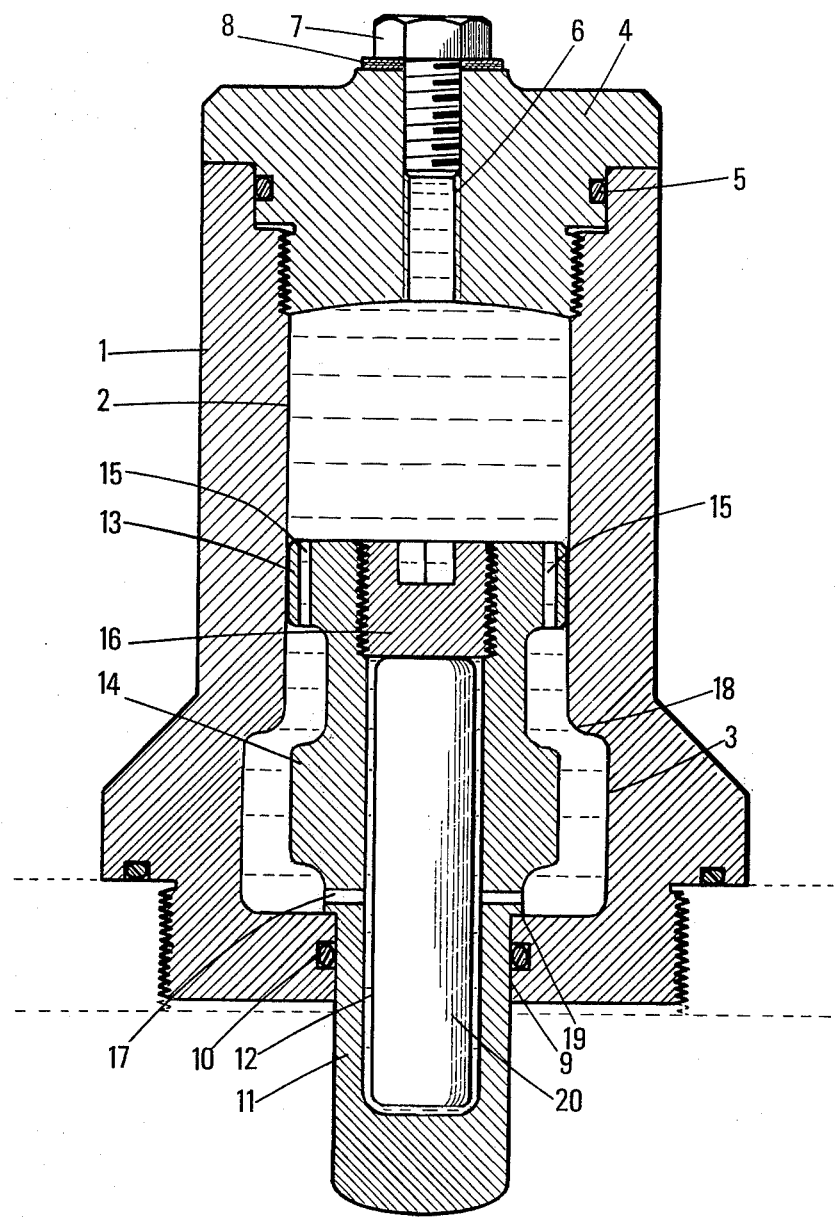

United States Patent [19]

Cholet et al.

[11] 3,944,031

[45] Mar. 16, 1976

[54] SHOCK ABSORBER

[75] Inventors: Jacques Cholet, Rueil-Malmaison; Jean Laurent, St. Germain-en-Laye; Pierre Magneville, Vernouillet, all of France

[73] Assignee: Institut Francais du Petrole, France

[22] Filed: June 18, 1974

[21] Appl. No.: 480,374

[30] Foreign Application Priority Data

June 18, 1973 France .................. 73.22171

[52] U.S. Cl. .................. 188/317; 188/298; 188/315
[51] Int. Cl.² ........................................ F16F 9/18
[58] Field of Search .......... 188/284, 298, 311, 313, 188/315, 316, 317, 322; 267/115, 116

[56] References Cited
UNITED STATES PATENTS

| 2,149,040 | 2/1939 | Binder et al. ........... 188/298 |
| 3,037,761 | 6/1962 | Rumsey ................. 188/298 |
| 3,584,331 | 6/1971 | D'Hooge ................ 188/298 |
| 3,784,179 | 1/1974 | Sugiura ................. 188/298 |

FOREIGN PATENTS OR APPLICATIONS

| 683,278 | 6/1930 | France ................. 188/316 |
| 963,662 | 7/1950 | France ................. 188/316 |
| 354,920 | 4/1921 | Germany ............... 188/311 |
| 1,136,221 | 9/1962 | Germany ............... 188/322 |

*Primary Examiner*—Trygve M. Blix
*Assistant Examiner*—Edward R. Kazenske
*Attorney, Agent, or Firm*—Craig & Antonelli

[57] ABSTRACT

Shock absorber comprising a casing delimiting an inner recess having two portions of different diameters and containing a liquid, a piston assembly consisting of two pistons of slightly different diameters mounted on the same rod and slidable into said recess, the larger of said pistons being traversed by a channel for liquid passage, a liquid reservoir either inside the rod or outside the casing, in communication with the inner recess through a further channel, sealing structure tightening the recess from the external medium and an element in the reservoir which is compressed or expanded in response to a change in the pressure of the liquid contained in the reservoir.

12 Claims, 4 Drawing Figures

SHOCK ABSORBER

This invention relates to a shock absorber which can be adapted to any apparatus comprising an element which is abruptly contacted with another element or with the ground. It may be, for example, particularly adapted to a sonic wave transmitter comprising two elements which are abruptly contacted with each other, in order to avoid any deterioration of said elements and to improve the quality of the sonic wave emission.

Shock absorbers are known which comprise a movable piston traversed by channels and sliding in a cylinder filled with liquid, the passage of the liquid through the channels resulting in a braking of the piston motion. These channels are, in some cases, provided with non-return valves.

The shock absorber according to this invention essentially comprises a casing made of a pressure-withstanding material which comprises at least two recesses of different cross-sections in communication with each other and substantially filled with liquid, an assembly of pistons displaceable along two directions of displacement in the recesses and solid with a rod, said assembly being guided in its motion by an orifice provided through the wall of the casing and whose cross-section is adapted to that of the rod and by guiding means inside said casing, braking means for the piston assembly when the latter is displaced mainly along one of said displacement directions and means for absorbing, during the displacement of the piston assembly, a portion of the liquid contained in said recesses.

The braking means may comprise a second piston whose cross-section is slightly smaller than that of the recess having the smallest cross-section, cooperating with the first piston traversed with channels and whose cross-section is adapted to that of the recess of smaller cross-section.

The advantages of the shock absorber according to the invention are the following:

It provides for the braking simultaneously by means of the channels of one of the pistons and by lamination effect at the level of the other piston; it also provides for the guiding of one of the pistons of the rod, i.e., a double guiding of the piston assembly and favours a work at low pressure of a sealing joint ensuring the tight sliding of the rod through the orifice of the casing wall.

Figure 2:
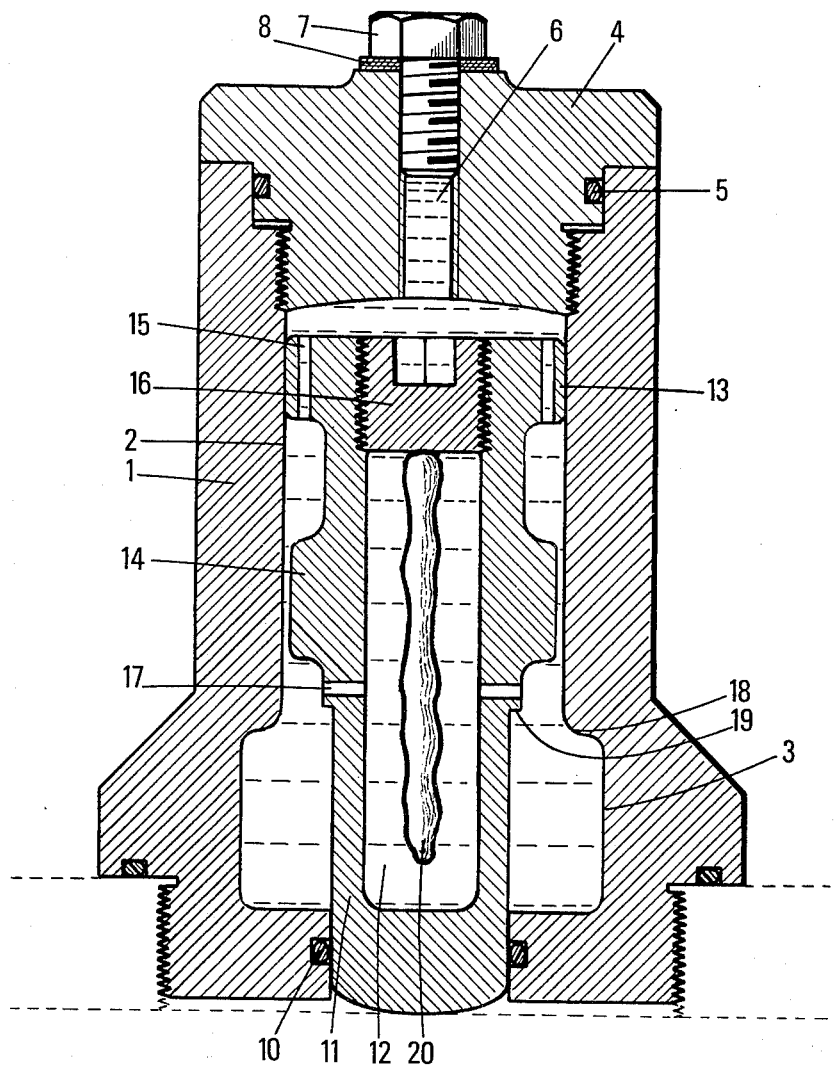
Figure 3:
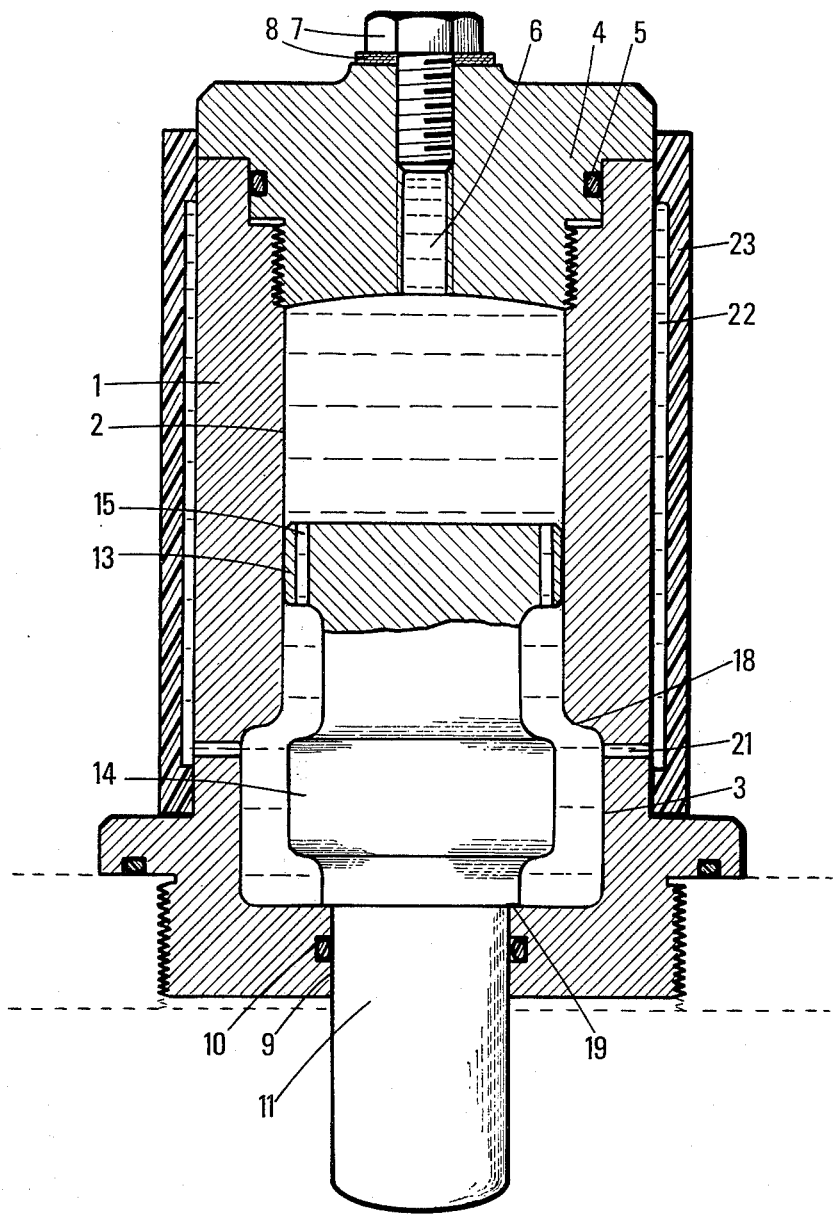
Figure 4:
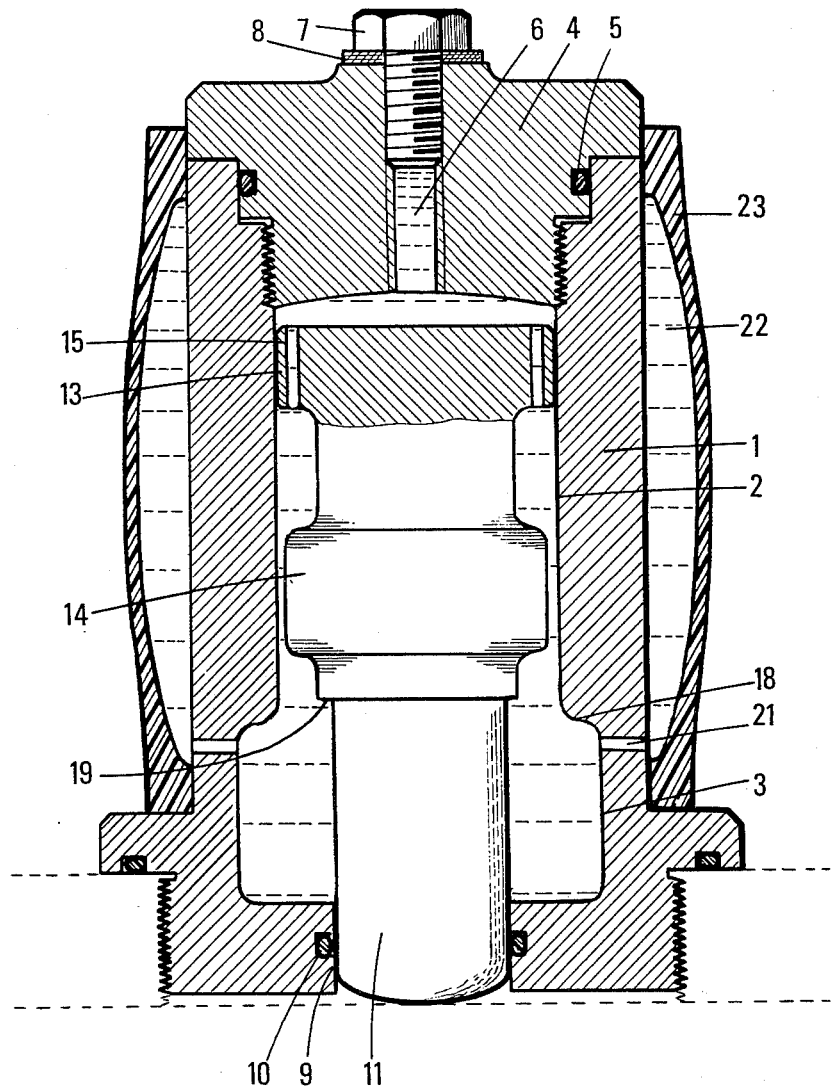

The shock absorber according to the invention will now be described more in detail with reference to the accompanying drawings, given by way of example and wherein:

FIG. 1 diagrammatically shows a cross-section of a first embodiment of the device in its initial position, comprising a reservoir inside the rod, provided with a compressible element;

FIG. 2 diagrammatically shows a cross-section of the same embodiment after its operation as shock absorber;

FIG. 3 diagrammatically shows a cross-section of a second embodiment of the device, in its initial position, comprising a reservoir outside the casing encompassing the recesses, provided with an expansible element; and FIG. 4 diagrammatically shows a cross-section of the same embodiment after its operation as shock absorber.

According to the embodiment shown in FIGS. 1 and 2, the device comprises a cylindrical casing 1, the wall of which comprises two parts 2 and 3 of different diameters, the part 3 having the larger diameter. The parts 2 and 3 are separated by a shoulder 18. One end of said cylindrical casing is closed by a plug 4, for example screwed on the casing and provided with a sealing joint 5. The plug 4 is traversed by a channel 6 for filling the casing with liquid. This channel is obturated, during operation, for example by means of a screw 7 provided with a sealing joint 8.

The other end of the casing, opposite to plug 4, is traversed by an orifice 9 provided with a sealing joint 10 and destined to the passage of the piston rod.

In its cylindrical casing, there is slidably mounted a piston assembly comprising a rod 11 in which is arranged a recess 12 forming a reservoir and which is provided with two pistons 13 and 14. Piston 13 has a diameter adapted to the inner diameter of part 2 of the casing wall 1 and comprises channels 15 passing throughout the same. Piston 14 has a diameter slightly smaller than that of part 2 of the casing wall. The diameter of rod 11 is adapted to that of orifice 9 so that said rod can slide therethrough. A double guiding of the piston assembly is thus achieved, one at the level of piston 13 and the other at the level of orifice 9.

Reservoir 12 is obturated in operating conditions by means of a plug 16 which, for example, is screwed at one end of the piston assembly. This recess communicates with the space inside casing 1 by means of channels 17. A shoulder 19 provided on the rod 11, acts as a stop member for limiting the stroke of the piston assembly. Inside reservoir 12 there is housed a bag 20 (FIG. 2), inflated with compressed air.

The operation of this shock absorber is as follows:

The inner space of casing 1 as well as reservoir 12 communicating therewith, contains oil.

In a first stage, the shoulder 19 abuts against the end of casing 1 on the side of orifice 9, the end of the rod 11 protruding from said casing. The bag 20 is expanded inside reservoir 12.

When a pressure is exerted on the protruding end of the rod 11, the piston assembly is displaced inside casing 1. The volume of the space defined by piston 13 and the bottom of the casing decreases and the oil contained in said space is displaced through channels 15 toward the space on the other side of piston 13. The piston assembly further penetrates the space inside casing 1, thereby reducing the volume thereof and undergoing a laminar flow between piston 14 and the part 2 of the inner wall of casing 1 (FIG. 2). The oil contained therein is compressed and penetrates through channel 17 into the reservoir 12 inside the rod 11, thereby compressing the bag or compressed air 20.

The lamination of the oil results in a braking of the movement of the piston assembly and the device thus acts as a damper.

When the end of rod 11 is no longer subjected to a pressure, the pressure exerted by the air compressed in the bag 20 is no longer balanced and said bag comes back to its expanded position, thereby expelling the oil contained in reservoir 12 toward the space inside casing 1, through channels 15 and 17, thereby resulting in a return of the piston assembly to its initial position as illustrated by FIG. 1.

According to a second embodiment of the device, illustrated in FIGS. 3 and 4, the piston assembly comprises a rod 11 provided with pistons 13 and 14 as in the preceding case, but this rod no longer comprises a reservoir communicating with the space inside casing 1. This space communicates, through channels 21, with a cylindrical chamber 22, forming a reservoir, delimited by the external wall of casing 1 and by a cylindrical membrane 23 of elastic material, surrounding casing 1 to which it is secured.

When, during the operation of the device, the piston assembly penetrates the inner space of casing 1, the oil is pressurized and expelled through channels 21 into reservoir 22. By the pressure effect, the cylindrical membrane 23 becomes deformed (FIG. 4) and the volume of reservoir 22 increases.

Similarly as in the preceding case, the oil undergoes a lamination between piston 14 and the part 2 of the inner wall of casing 1. This lamination, as well as the resistance exerted by the elastic membrane 23, results in a dampening of the motion of the piston assembly.

When the end of the rod 11 is no longer subjected to a pressure, the resistant force exerted both by the external prevailing pressure and by the expanding elastic membrane 23 is no longer balanced. This membrane thus comes back to its initial position by expelling the oil contained in the cylindrical reservoir 22 toward the space inside casing 1. The piston assembly is displaced and the system takes again its initial position (FIG. 3).

Also in this embodiment, a double guiding of the piston assembly is achieved at the level of piston 13 and at the level of orifice 9 respectively.

In the preceding embodiments, shown by way of example, the inner wall of casing 1 as well as the pistons, were cylindrical, but one part of wall 2 and/or the piston 14 might also be of conical shape, or have a special profile corresponding to a predetermined law of motion.

Similarly, the bag of compressed air or reservoir 12, as well as the elastic membrane of reservoir 22, may be replaced by any other compressible and expansible elements without departing from the scope of the invention.

In any case, the joint 10, ensuring the sealing between the inner space of casing 1 and the external medium, works at high speed but however at low pressure, which a supplementary advantage of the system.

We claim:

1. A shock absorber comprising a casing of a pressure-withstanding material, said casing having an inner wall defining at least a first and a second recess in communication with each other, said first recess having a smaller cross-section than that of said second recess, and each of said first and second recesses being substantially filled with fluid; a piston assembly being displaceable in opposite directions within said casing, said piston assembly comprising a rod extending slidably through an orifice through said inner wall of said casing, a first piston integral with said rod and having at least one orifice for communicating opposite sides of said first piston, and a second piston integral with said rod and disposed between said first piston and said orifice through said inner wall, said first piston having a cross-section larger than that of said second piston with said first piston slidably engaging the inner wall defining said first recess along the entire displacement of said piston assembly, and said second piston having a cross-section slightly smaller than that of said first recess and being guided past the inner wall defining said first recess only during a portion of the entire displacement of said piston assembly; and means for absorbing a portion of said fluid during the displacement of said piston assembly.

2. A shock absorber according to claim 1, wherein said means for absorbing comprises a reservoir having orifices for communicating with said first and second recesses, and means for returning said piston assembly to its initial position after operation.

3. A shock absorber according to claim 2, wherein said reservoir is arranged within said rod.

4. A shock absorber according to claim 2, wherein said reservoir is arranged around said casing encompassing said first and second recesses.

5. A shock absorber according to claim 2, wherein said means for returning said piston assembly consists of a compressible element.

6. A shock absorber according to claim 5, wherein said compressible element is a bag of compressed air.

7. A shock absorber according to claim 2, wherein said means for returning said piston assembly consists of an expansible element.

8. A shock absorber according to claim 7, wherein said expansible element is made of an elastic membrane forming a wall of said reservoir.

9. A shock absorber according to claim 1, wherein said second piston brakes said piston assembly during displacement by lamination of said fluid between said inner wall defining said first recess and said second piston.

10. A shock absorber comprising a casing having a wall of a pressure-withstanding material, said casing including at least two elongated recesses of different cross-sections communicating with each other and substantially filled with liquid, a piston assembly comprising a first piston traversed with orifices and a second piston having a cross-section smaller than that of said first piston, said first and second pistons being integral with a rod, said piston assembly being displaceable along opposite directions within said casing and being guided both by an orifice arranged through said wall of said casing with said rod being slidable therethrough, and by said first piston of a larger cross-section than that of said second piston slidably engaging an inner wall of said casing defining the recess having a smaller cross-section along the entire displacement of said piston assembly, said second piston of said piston assembly being disposed between said first piston and said orifice through said wall, and having a cross-section slightly smaller than said recess of smaller cross-section, and said second piston being guided past said inner wall defining said recess of smaller cross-section for a length shorter than said displacement of said piston assembly, a reservoir arranged around said casing and provided with orifices for communication with at least one of said recesses, and means for returning said piston assembly to its initial position after operation.

11. A shock absorber according to claim 10 wherein said means for returning said piston assembly consists of an expansible element.

12. A shock absorber according to claim 11, wherein said expansible element is made of an elastic membrane forming a wall of said reservoir.

* * * * *